United States Patent
Flender et al.

(10) Patent No.: US 9,347,340 B2
(45) Date of Patent: May 24, 2016

(54) BEARING BLOCK FOR A CAMSHAFT

(75) Inventors: Thomas Flender, Eberdingen (DE);
Michael Kreisig, Stuttgart (DE); Falk Schneider, Korntal-Münchingen (DE);
Stefan Steichele, Gerlingen (DE)

(73) Assignee: Mahle International GmbH (DE)

( * ) Notice: Subject to any disclaimer, the term of this patent is extended or adjusted under 35 U.S.C. 154(b) by 645 days.

(21) Appl. No.: 13/097,883

(22) Filed: Apr. 29, 2011

(65) Prior Publication Data

US 2011/0265749 A1    Nov. 3, 2011

(30) Foreign Application Priority Data

Apr. 30, 2010   (DE) .................. 10 2010 019 129

(51) Int. Cl.
| | |
|---|---|
| *F01L 1/02* | (2006.01) |
| *F01L 1/053* | (2006.01) |
| *F01L 1/18* | (2006.01) |
| *F16C 35/04* | (2006.01) |
| *F01L 1/047* | (2006.01) |

(52) U.S. Cl.
CPC ............... *F01L 1/053* (2013.01); *F01L 1/181* (2013.01); *F16C 35/047* (2013.01); *F01L 2001/0475* (2013.01); *F01L 2001/0476* (2013.01); *F01L 2103/00* (2013.01)

(58) Field of Classification Search
CPC ... F01L 1/053; F01L 1/181; F01L 2001/0476; F01L 2103/00; F01L 2001/0475; F16C 35/047
USPC ................................. 123/90.27, 195 A, 195 C
See application file for complete search history.

(56) References Cited

U.S. PATENT DOCUMENTS

| | | | | |
|---|---|---|---|---|
| 4,602,604 | A | | 7/1986 | Kauer |
| 5,005,544 | A | * | 4/1991 | Spangler .................. 123/195 R |
| 5,339,778 | A | * | 8/1994 | Reckzugel et al. ........ 123/193.5 |
| 5,617,818 | A | | 4/1997 | Luders |
| 6,584,943 | B1 | * | 7/2003 | Klotz .......... 123/90.16 |
| 8,042,506 | B2 | * | 10/2011 | Shoji ........... 123/90.27 |
| 8,161,927 | B2 | * | 4/2012 | Ochiai et al. ............... 123/90.27 |
| 2002/0035983 | A1 | * | 3/2002 | Kobayashi ............... 123/196 M |
| 2002/0056425 | A1 | * | 5/2002 | Kobayashi ................ 123/90.15 |
| 2002/0134337 | A1 | | 9/2002 | Uchida |
| 2002/0139336 | A1 | | 10/2002 | Tanaka et al. |
| 2003/0101952 | A1 | * | 6/2003 | Uehara et al. .............. 123/90.16 |
| 2004/0094109 | A1 | * | 5/2004 | Machida .................... 123/90.31 |
| 2005/0211197 | A1 | * | 9/2005 | Fujii et al. .................... 123/90.2 |
| 2009/0101096 | A1 | * | 4/2009 | Ochiai et al. ............... 123/90.27 |
| 2009/0165737 | A1 | * | 7/2009 | Kreisig et al. ............... 123/90.6 |

(Continued)

FOREIGN PATENT DOCUMENTS

| | | |
|---|---|---|
| DE | 3516992 A1 | 11/1985 |
| DE | 4431697 C1 | 2/1996 |

(Continued)

OTHER PUBLICATIONS

English abstract for DE-4431697.

*Primary Examiner* — Zelalem Eshete
(74) *Attorney, Agent, or Firm* — Fishman Stewart PLLC

(57) ABSTRACT

A bearing block comprises a camshaft in an internal combustion engine and a valve drive. The valve drive may include at least one rocker arm mounted on a rocker arm shaft, wherein the bearing block is formed concurrently with the mounting of the at least one rocker arm.

7 Claims, 1 Drawing Sheet

(56) References Cited

U.S. PATENT DOCUMENTS

| | | | |
|---|---|---|---|
| 2009/0178630 A1* | 7/2009 | Kuromatsu et al. | 123/90.6 |
| 2009/0241880 A1 | 10/2009 | Tsubakino et al. | |
| 2010/0012059 A1* | 1/2010 | Abe et al. | 123/90.1 |
| 2010/0065010 A1* | 3/2010 | Abe | 123/195 A |
| 2011/0265749 A1* | 11/2011 | Flender et al. | 123/90.39 |
| 2013/0055981 A1* | 3/2013 | Flender et al. | 123/90.27 |
| 2013/0055982 A1* | 3/2013 | Flender et al. | 123/198 R |

FOREIGN PATENT DOCUMENTS

| | | |
|---|---|---|
| DE | 19504637 A1 | 8/1996 |
| DE | 10213557 A1 | 10/2002 |
| EP | 1201884 A2 | 5/2002 |

* cited by examiner

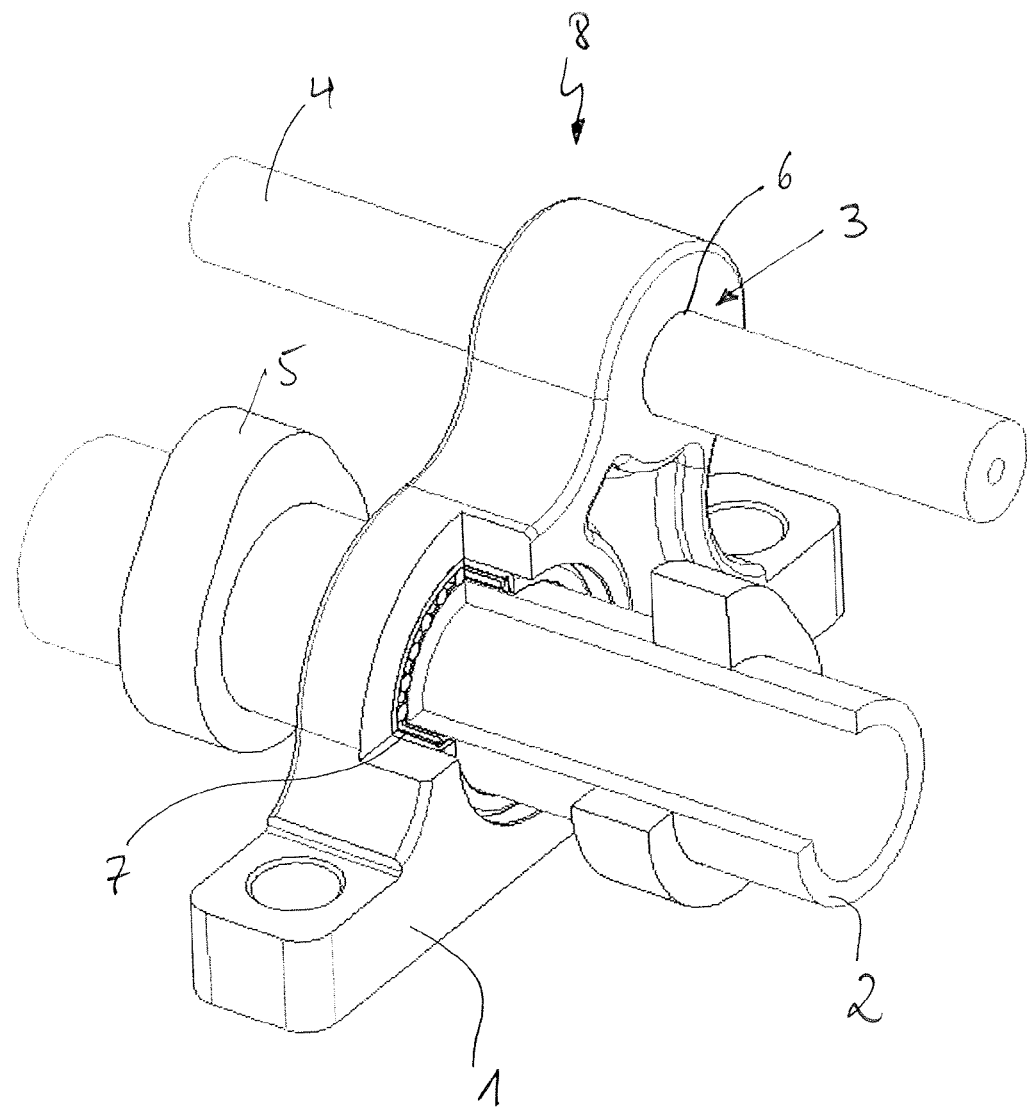

BEARING BLOCK FOR A CAMSHAFT

CROSS-REFERENCES TO RELATED APPLICATION

This application claims priority to German patent application DE 10 2010 019 129.9 filed on Apr. 30, 2010, which is hereby incorporated by reference in its entirety.

TECHNICAL FIELD

The present invention relates to a bearing block for a camshaft in an internal combustion engine according to the preamble of the claim 1. The invention relates in addition to a prefabricated valve drive unit and an internal combustion engine having at least one such bearing block.

BACKGROUND

Camshafts are used in internal combustion engines for controlling the intake and exhaust valves and, for this purpose, have cams which, via a valve drive, more specifically, via a rocker arm, actuate an associated intake or exhaust valve. Said rocker arms are mounted so as to be pivotable about a rocker arm shaft and are arranged, for example, on a cylinder head. The camshaft itself is also mounted on the cylinder head, for example in split bearing shells, one of which is arranged on the cylinder head and the other one is formed by a bearing block. In general, such a valve drive is constructionally complicated and therefore relatively expensive.

SUMMARY

The present invention is concerned with the problem to provide, for a bearing block of the generic kind, an improved or at least an alternative embodiment which simplifies in particular the design of a valve drive.

This problem is solved according to the invention by the subject matters of the independent claims. Advantageous embodiments are subject matter of the dependent claims.

The present invention is based on the general idea to configure a valve drive of an internal combustion engine in a constructionally simpler manner in that on a bearing block for mounting the camshaft at the same time also a bearing seat for a rocker arm shaft for rocker arms of the valve drive is provided. Thus, in the bearing block according to the invention which supports/fixes the camshaft in a known manner on the cylinder head of an internal combustion engine, at the same time, the rocker arm shaft is arranged about which the rocker arms are pivotably mounted for actuating the intake and exhaust valves. In general, with the bearing block according to the invention it is also possible to prepare a prefabricated valve drive unit which comprises at least the camshaft, two bearing blocks as well as the rocker arm shaft which is arranged thereon and includes the rocker arms. This prefabricated valve drive unit can then be installed on the internal combustion engine. With the bearing block according to the invention, in addition, separate bearing seats for mounting the rocker arm shaft are eliminated, whereby the valve drive and in particular also the mounting of the rocker arm shaft are significantly simplified.

In an advantageous development of the solution according to the invention, the bearing block is made in one piece. In this case, the bearing block can be manufactured in a simple manner and preferably without major rework and can then be threaded onto the camshaft. In the same manner, parallelly or subsequently, the rocker arm shaft can be inserted through a bearing eye provided for this purpose at the bearing block and can be fixed, wherein the fixation can be carried out by means of thermal joining. Of course, alternatively, it is also conceivable that the bearing block is formed from a plurality of components, wherein the mounting means of the camshaft and/or the mounting means of the rocker arm shaft can be formed as split bearing. Such an embodiment has the great advantage that individual bearing blocks, in particular bearing blocks arranged on the end sides, can be replaced separately without the need that the adjacent bearing blocks have to be removed too. Connecting the individual components of the bearing block can take place, for example, by means of screws.

Advantageously, between the bearing block and the camshaft, a rolling bearing is arranged. Such rolling bearings which, for example, are configured as ball bearing or cylinder roller bearing, reduce the frictional or bearing resistance considerably and provide for a smooth-running and durable mounting means of the camshaft.

Further important features and advantages of the invention arise from the sub-claims, from the drawings, and from the associated description of the FIGURES based on the drawings.

It is to be understood that the above mentioned features and the features yet to be explained hereinafter can be used not only in the respectively mentioned combination but also in other combinations or alone without departing from the context of the present invention.

BRIEF DESCRIPTION OF THE DRAWING

A preferred exemplary embodiment of the invention is illustrated in the drawing and is explained in more detail in the following description.

The only FIG. 1 shows a bearing block according to the invention.

DETAILED DESCRIPTION

According to the FIG. 1, a bearing block 1 according to the invention for mounting a camshaft 2 in a non-illustrated internal combustion engine has at the same time a bearing seat 3 for mounting a rocker arm shaft 4 of a rocker arm which is also not shown. The rocker arm is integral part of a non-shown valve drive and transmits in a known manner a force exerted by a cam 5 of the camshaft 2 on an intake or exhaust valve of the internal combustion engine. The bearing block 1 has a bearing eye 6 in which the rocker arm shaft 4 is mounted.

In general,—as it is illustrated in FIG. 1—the bearing block 1 can be made in one piece or, alternatively, can be assembled from a plurality of components, wherein then the mounting means of the camshaft 2 and/or the mounting means of the rocker arm shaft 4 are formed as split bearings. The configuration of the bearing block 1 as one single piece has the great advantage of a cost-effective and, at the same time, technically simple manufacturability of the bearing block 1. A multi-part configuration of the bearing block 1, on the other hand, offers the great advantage that, for example, it is also possible that bearing blocks 1 arranged centrally on the camshaft 2 can be replaced without the need to disassemble the axially adjacent bearing blocks.

In order to ensure a smooth-running mounting means of the camshaft 2 in the bearing block 1, a rolling bearing 7 can be provided between the bearing block 1 and the camshaft 2, which rolling bearing is formed, for example, as ball bearing, needle bearing or cylinder roller bearing. Such a smooth-running bearing of the camshaft 2 is in particular important for the implementation of LFC camshafts (Low Friction Camshafts). Usually, the rocker arm shaft 4 is firmly fixed in the associated bearing eye 6, in particular joined with the same, for example thermally joined, for which reason the rocker arm shaft 4 is cooled and/or the bearing block 1 is heated. Of course, also conceivable is a press fit between the rocker arm shaft 4 and the bearing eye 6 of the bearing block 1.

Moreover, with the bearing block 1 according to the invention it is possible to prepare a prefabricated valve drive unit 8 which comprises at least the camshaft 2, two bearing blocks 1 as well as a rocker arm shaft 4 arranged thereon. Usually, of course, the cams 5 as well as the rocker arms are also part of the prefabricated valve drive unit 8.

With the bearing block 1 according to the invention it is therefore possible to integrate previously separate bearings for mounting the rocker arm shaft 4 into the bearing block 1 and thereby to implement the valve drive of an internal combustion engine in an overall simpler and more cost-effective manner. The bearing block 1 can be configured here in the form of single-piece bearing that can be threaded on or in the form of a split bearing. Particularly advantageous is the possibility to provide with the bearing block 1 according to the invention, a prefabricatable valve drive unit 8 which as a whole, thus completely, can be assembled, in particular screwed, onto a cylinder head of an internal combustion engine.

The invention claimed is:

1. A bearing block system comprising: a camshaft in an internal combustion engine, a valve drive including at least one rocker arm mounted on a rocker arm shaft, wherein the bearing block system further includes a single piece block having a bearing eye, and the rocker arm shaft is one of press fit and thermally joined in the bearing eye;
    wherein the single piece block has an annular opening configured to mount the camshaft therein and the single piece block is a single material that includes the annular opening and extends from the bearing eye to the annular opening.

2. The bearing block system according to claim 1, further comprising a rolling bearing disposed between the single piece block and the camshaft.

3. The bearing block system according to claim 1, wherein the rocker arm shaft is thermally joined to the bearing eye by way of cooling the rocker arm shaft and heating the single piece block.

4. A prefabricated valve drive unit comprising: at least one camshaft, at least two single piece blocks and a rocker arm shaft, wherein each one of the single piece blocks has a bearing eye, and the rocker arm shaft is one of press fit and thermally joined in the bearing eye of each single piece block;
    wherein each one of the single piece blocks has an annular opening configured to mount the at least one camshaft therein, and each one of the single piece blocks is a single material that includes the bearing eye and extends from the bearing eye to the annular opening.

5. The prefabricated valve drive unit according claim 4, further comprising a rolling bearing disposed between each single piece block and the at least one camshaft.

6. An internal combustion engine comprising: at least two single piece blocks and at least one prefabricated valve drive unit, wherein the drive unit includes at least one camshaft, at least two single piece blocks and a rocker arm shaft, wherein each one of the single piece blocks has a bearing eye, and the rocker arm shaft is one of press fit and thermally joined in the bearing eye of each single piece block;
    wherein each one of the single piece blocks has an annular opening configured to mount the at least one camshaft therein, and each one of the single piece blocks is a single material that includes the bearing eye and extends from the bearing eye to the annular opening.

7. The internal combustion engine according claim 6, further comprising a rolling bearing disposed between each single piece block and the at least one camshaft.

* * * * *